US010002140B2

(12) United States Patent
Reddy et al.

(10) Patent No.: US 10,002,140 B2
(45) Date of Patent: *Jun. 19, 2018

(54) GEOGRAPHICAL LOCATION SEARCH USING MULTIPLE DATA SOURCES

(71) Applicant: Uber Technologies, Inc., San Francisco, CA (US)

(72) Inventors: Srihari Reddy, Sunnyvale, CA (US); Brent Hamby, Oakland, CA (US); Aditya Sarawgi, San Francisco, CA (US); Govind Kabra, Sunnyvale, CA (US); Manik Gupta, Los Altos, CA (US); Jennie Nguyen, Foster City, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/393,171

(22) Filed: Dec. 28, 2016

(65) Prior Publication Data

US 2018/0089227 A1 Mar. 29, 2018

Related U.S. Application Data

(63) Continuation of application No. 15/392,010, filed on Dec. 28, 2016.
(Continued)

(51) Int. Cl.
*G06F 17/30* (2006.01)
(52) U.S. Cl.
CPC .... *G06F 17/30241* (2013.01); *G06F 17/3087* (2013.01); *G06F 17/30554* (2013.01)

(58) Field of Classification Search
CPC ......... G06F 17/30241; G06F 17/30554; G06F 17/3087
(Continued)

(56) References Cited

U.S. PATENT DOCUMENTS

| 7,542,882 B2 | 6/2009 | Agrawala et al. |
| 8,626,788 B2 | 1/2014 | O'Donnell |

(Continued)

FOREIGN PATENT DOCUMENTS

WO    WO 2013/043613 A1    3/2013

OTHER PUBLICATIONS

United States Preinterview First Office Action, U.S. Appl. No. 15/436,688, dated Apr. 24, 2017, 5 pages.
(Continued)

*Primary Examiner* — Marthe Y Marc-Coleman
(74) *Attorney, Agent, or Firm* — Fenwick & West LLP

(57) ABSTRACT

A service arrangement system coordinates service providers who provide geographical location-based services to users. The location-based services may include transportation of users. For example, a service provider operates a vehicle to transport a user from an origin location to a destination location. To provide an engaging user experience and encourage users to continue using the services, the service arrangement system accurately and expediently determines the origin location and the destination location based on querying available data sources. The service arrangement system can use selection rules for multiplexing, fallback logic, or load-balancing to select a high quality data source from the available data sources.

20 Claims, 11 Drawing Sheets

Related U.S. Application Data

(60) Provisional application No. 62/399,906, filed on Sep. 26, 2016.

(58) Field of Classification Search
USPC .................. 701/410; 707/E17.005, E17.018
See application file for complete search history.

(56) References Cited

U.S. PATENT DOCUMENTS

| | | |
|---|---|---|
| 2005/0165738 A1 | 7/2005 | Lancefield |
| 2008/0307004 A1 | 12/2008 | O'Donnell |
| 2013/0124558 A1 | 5/2013 | O'Donnell |
| 2013/0132140 A1 | 5/2013 | Amin et al. |
| 2013/0297378 A1* | 11/2013 | Hong ..................... G06Q 50/16 |
| | | 705/7.29 |
| 2015/0339923 A1 | 11/2015 | Konig et al. |

OTHER PUBLICATIONS

PCT International Search Report and Written Opinion, PCT Application No. PCT/IB2017/055712, dated Jan. 23, 2018, 17 pages.

\* cited by examiner

| Search String | Search Results |
|---|---|
| T | The Waterfront, 717 Battery St, San Francisco, CA 94111<br><br>The SF Hotel, 600 Stockton St, San Francisco, CA 94108 |
| Ta | Taco Shop, 7 Drumm St San Francisco, CA 94111<br><br>Table Shop, 789 Mission St San Francisco, CA 94103 |
| Tah | Truckee Tahoe Airport-TRK<br><br>The Lake Tahoe Hotel, 13031 Ritz Carlton Highlands Ct, Truckee, CA 96161 |
| Taho | Truckee Tahoe Airport-TRK<br><br>The Lake Tahoe Hotel, 13031 Ritz Carlton Highlands Ct, Truckee, CA 96161 |
| Tahoe | Truckee Tahoe Airport-TRK<br><br>The Lake Tahoe Hotel, 13031 Ritz Carlton Highlands Ct, Truckee, CA 96161 |

GEOGRAPHICAL LOCATION SEARCH USING MULTIPLE DATA SOURCES

CROSS-REFERENCE TO RELATED APPLICATIONS

This application is a continuation of U.S. patent application Ser. No. 15/392,010, filed on Dec. 28, 2016, which claims the benefit of U.S. Provisional Application No. 62/399,906 filed Sep. 26, 2016. All of the foregoing are incorporated by reference in their entirety for all purposes.

BACKGROUND

1. Field of Art

The present disclosure generally relates to the field of geographical location search, and more specifically to optimizing geographical location search results to users of a service arrangement system.

2. Description of the Related Art

Data sources of geographical information may include addresses, streets, and points of interest (POI). Users can input a search string to query for a particular address, and a data source provides search results by matching locations based on the search string. However, data maintained by each data source may differ, and one data source may contain high-quality detailed information in one area but contain incomplete information in another. Thus, the queried data source may not always include the particular location being searched for by a user. Additionally, a given data source that has a large volume of queries may experience slow response times if the data source is resource-constrained, e.g., reaching maximum processor or memory usage.

A service arrangement system can receive trip requests from users to receive trip services from an origin to a destination, and the service arrangement system may provide location queries to one or more data sources. If users of the coordination system perceive slow response times resulting from a data source's delay, the users may stop using the service arrangement system's services. For example, users can request a trip from the service arrangement system, where the particular address is the origin or destination location for the trip. If the service arrangement system cannot find the particular address from the data source, the service arrangement system may not be able to provide the trip to the user, or may provide poor service based on an incorrect address. It would be desirable to reliably search for geographical locations from various data sources that may differ in location data quality in different geographical regions, and for the system to handle search requests at a large scale.

BRIEF DESCRIPTION OF DRAWINGS

FIG. 4 is a diagram of a sequence of search strings according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A service arrangement system coordinates service providers who provide geographical location-based services to users. The location-based services may include transportation of users. For example, a service provider operates a vehicle to transport a user from an origin location to a destination location. To provide an engaging user experience and encourage users to continue using the services, the service arrangement system accurately and expediently determines the origin location and the destination location based on querying available data sources. For instance, a user is more likely to take a trip using the service arrangement system if the user can quickly find the origin or destination location for the trip.

The service arrangement system can use selection rules for multiplexing, fallback logic, or load-balancing to select a data source from the available data sources. For instance, the service arrangement system "multiplexes" multiple data sources by determining which data sources provide higher quality search results than other data sources, which may depend on various factors. As an example, a first data source provides higher quality search results when searching for restaurants in a given geographical region, while a second data source provides higher quality search results when searching for parks in the given geographical region. Additionally or alternatively, the service arrangement system uses fallback logic or load-balancing to reduce the latency between receiving search requests and providing the corresponding search results. For example, the service arrangement system uses load-balancing, also referred to as load-shedding, to switch to the second data source if the first data source is reaching a capacity of search requests that the first data source can service during a given interval of time. As another example, the service arrangement system uses fallback logic to select or switch between data source based on the quality of search results.

I. System Overview

Figure 1A:
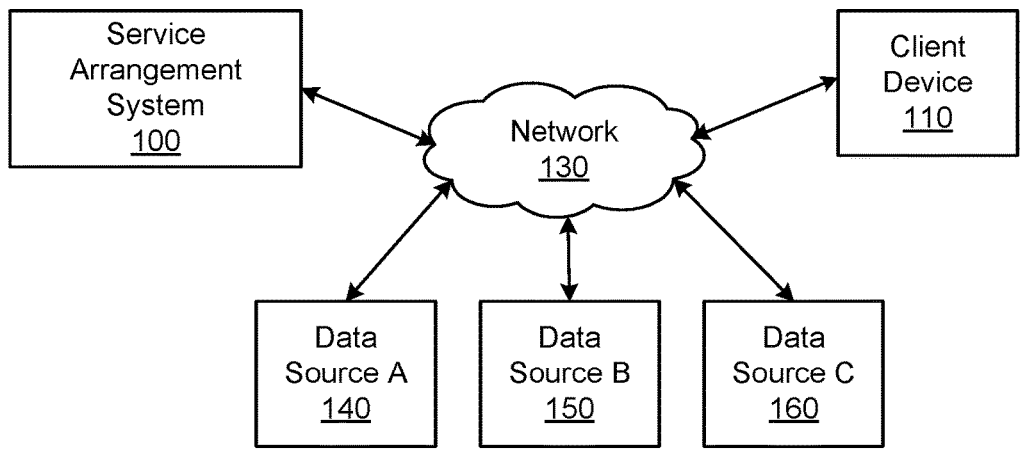
FIG. 1A is a diagram of a system environment for a service arrangement system according to one embodiment.

FIG. 1A is a diagram of a system environment for a service arrangement system 100 according to one embodiment. Users of the service arrangement system 100 may include service providers that provide service to other users. In an example use case, a service provider operates a vehicle to transport a user from a first location (e.g., an origin or pickup location) to a second location (e.g., a drop-off location). Other types of service include, for example, delivery of goods (e.g., mail, packages, or consumable items) or services.

The system architecture includes the service arrangement system 100, one or more client devices 110 of users, and multiple data sources such as data source A 140, data source B 150, and data source C 160. A data source may also be referred to herein as a "map data source," as a map data source provides map information that can be used for search results. However, any suitable type of data or service provider can be used in alternative embodiments. The various systems shown in FIG. 1 are connected to each other via a network 130. In other embodiments, different and/or additional entities can be included in the system architecture. The functions performed by the various entities of FIG. 1 may vary in different embodiments. The service arrangement system 100 provides search results from the data sources in response to search requests from users.

For example, a user searches for a target geographical location (e.g., a desired location) as the destination location (or the origin location) of a trip. The data sources 140, 150, and 160 may include databases of map information of various geographical regions. To service a user's search request, the service arrangement system 100 selects one (or more) of the three data sources to service the search request and provides the search results from the selected data source(s) to the user. The search results may be based on map information from the selected data source and include any number of candidate geographical locations (e.g., addresses or names of locations). The user may select one of the candidate geographical locations to use as the target geographical location. If there are no search results from one of the data sources, or the search results have unsatisfactory quality, the service arrangement system 100 can select a different data source from which to receive additional search results.

A user can interact with the service arrangement system 100 through the client device 110, e.g., to request transportation or to receive requests to provide transportation. As described herein, a client device 110 can be a personal or mobile computing device, such as a smartphone, a tablet, or a notebook computer. In some embodiments, the client device 110 executes a client application that uses an application programming interface (API) to communicate with the service arrangement system 100 through the network(s) 130.

In one embodiment, through operation of the client device 110, a user makes a trip request to the service arrangement system 100. For example, the trip request may include user identification information, the number of passengers for the trip, a requested type of the service provider (e.g., a vehicle type or service option identifier), the current location and/or the origin location (e.g., a user-specific geographical location for pickup, or a current geographical location of the client device 110), and/or the destination for the trip. The current location (or origin location) of the client device 110 may be designated by the user (e.g., based on an input string of text or audio/voice signal), or detected using a location sensor of the client device 110 such as a global positioning system (GPS) receiver. The user may also input feedback via a user interface of the client device 110, e.g., the user inputs text-based feedback or feedback represented as a rating using a touchscreen keyboard of the client device 110. Before, during, or after the trip, the client device 110 can provide the feedback to the service arrangement system 100.

In some embodiments, a service provider uses a client device 110 to interact with the service arrangement system 100 and receive invitations to provide service for users. For example, the service provider is a person operating a vehicle capable of transporting users. In some embodiments, the service provider is an autonomous vehicle that receives routing instructions from the service arrangement system 100. For convenience, this disclosure generally uses a car as the vehicle, which is operated by a driver as an example service provider. However, the embodiments described herein may be adapted for a provider operating alternative vehicles (e.g., boat, airplane, helicopter, etc.) or vehicles that do not necessarily need to be operated by a person.

In some embodiments, a service provider can receive invitations or assignment requests through a client device 110. An assignment request identifies a user who submitted a trip request to the service arrangement system 100 and determines the origin location and/or the destination of the user for a trip. For example, the service arrangement system 100 can receive a trip request from a client device of a user, select a service provider from a pool of available (or "open") service providers to provide the trip, e.g., based on the determined origin location and/or the destination. The service arrangement system 100 transmits an assignment request to the selected service provider's client device. The service arrangement system 100 may determine the origin location and/or destination location using one or more of the data sources 140, 150, and 160.

The service arrangement system 100 can also transmit other information to the client device 110 of the service provider or user for display before, during, and after the trip. For example, the service arrangement system 100 provides a message to the client device of a user indicating that the service provider is approaching (or has arrived at) the origin location of the user. The user and service provider may also communicate with each other (e.g., via the service arrangement system 100) using client devices. For example, the user may call or send a text message to the service provider to coordinate the rendezvous of the user and the service provider if a previously determined origin location is inaccurate or has changed since the determination of the origin location.

Client devices 110 may interact with the service arrangement system 100 through a client application configured to interact with the service arrangement system 100. The client application of the client device can present information received from the service arrangement system 100 on a user interface, such as a map of the geographic region and the current location of the client device 110. The client application running on the client device can determine the current location and provide the current location to the service arrangement system 100.

The client device 110 and the data sources 140, 150, and 160 can communicate with the service arrangement system 100 via the network 130, which may comprise any combination of local area and wide area networks employing wired or wireless communication links. In one embodiment, the network 130 uses standard communications technologies and protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 130 may be represented using any format, such as hypertext markup language (HTML) or extensible markup language (XML). In some embodiments, all or some of the communication links of the network 130 may be encrypted.

Figure 1B:
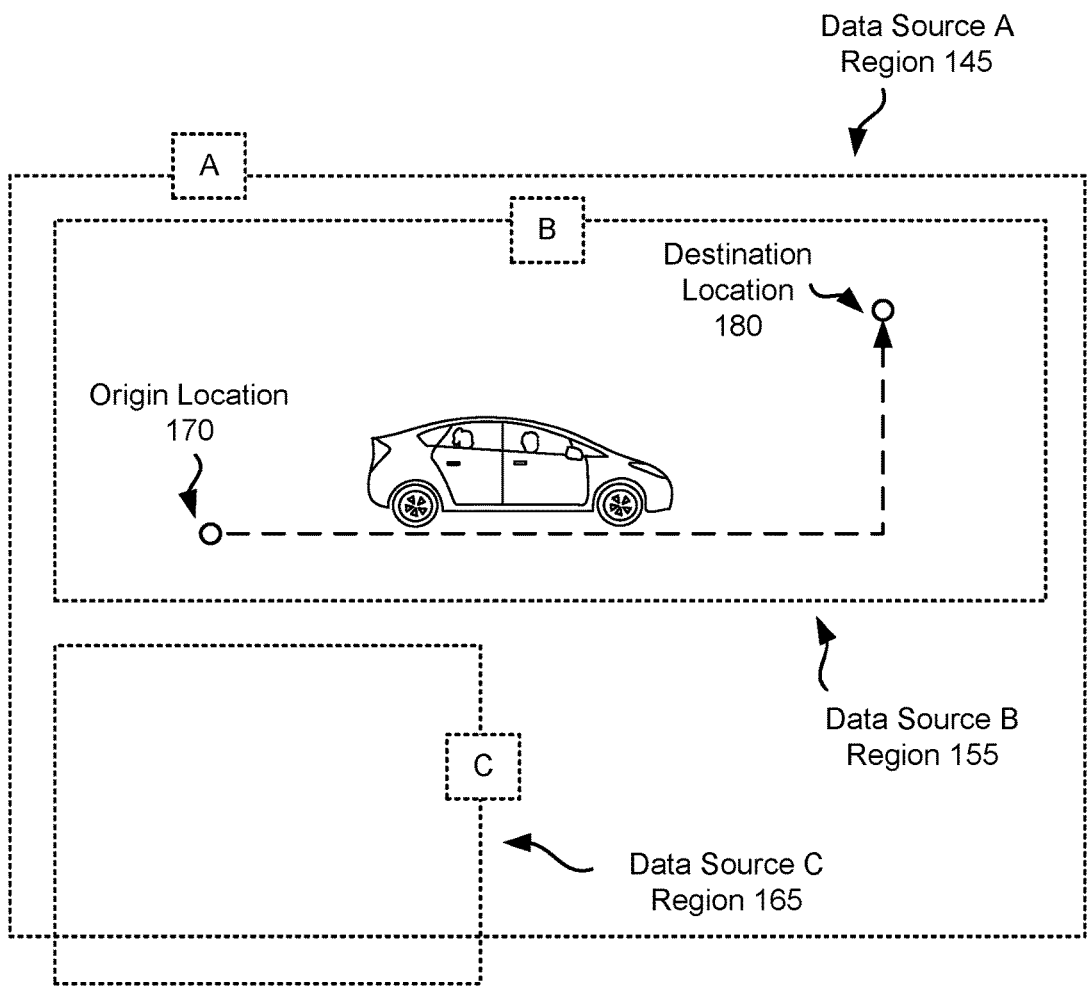
FIG. 1B is a diagram illustrating data coverage regions provided by data sources of the service arrangement system according to one embodiment.

FIG. 1B is a diagram illustrating data coverage regions provided by data sources of the service arrangement system 100 according to one embodiment. In particular, Data Source A 140, Data Source B 150, and Data Source C 160 of FIG. 1A provide data associated with Data Source A Region 145, Data Source B Region 155, and Data Source C Region 165, respectively. A data source includes map information of a corresponding geographical region, for example, geographical locations located within the geographic region. Types of geographical locations include point addresses or address ranges, geographies, landmarks, venues, points of interest (POIs), roads or intersections, etc. Example point addresses include "555 California Street" or "7000 Coliseum Way," and may include city, state, and/or zip code information such as "San Francisco, Calif. 94104" or "Oakland, Calif. 94621." Example address ranges include "100-400 Castro Street" or "Market Street between $4^{th}$ Street and $5^{th}$ Street." Example geographies include a river, lake, mountain, or other geographical landmarks. Example landmarks include a statue, building, mountain, or monument. Example venues include stadiums for music concerts, sporting events, or conventions.

Points of interest may include residential buildings (e.g., singe- or multi-unit homes, condominiums, or apartments), commercial buildings (e.g., restaurants, stores, office buildings, or airports), tourist attractions (e.g., parks, monuments, or sight-seeing spots), among other types of POIs such as a public transit station or a trailhead for a hiking trail. In some embodiments, a data source may be associated with one or more particular types of POIs (or any other particular type of map information). Thus, each data source may provide a different set of location data, having different coverage and/or having different sets of types of POI information. For instance, Data Source B 150 includes map information of POIs of residential buildings and commercial buildings within the Data Source B Region 155 (e.g., a suburban area); Data Source C 160 includes map information of POIs of tourist attractions within the Data Source C Region 165; and Data Source A 140 includes map information of point addresses within the Data Source A Region 145.

A data source region may overlap with or be located within another data source region. For example, Data Source B Region 155 is located within Data Source A Region 145. Furthermore, a data source region may be partially located within another data source region, for example, Data Source C Region 165 is partially located within Data Source A Region 145. The map information also may associate geographical locations with longitude and latitude information and/or GPS coordinates. Accordingly, for a given geographical location, desired locations may be available from different data sources, each of which may provide locations according to the locations and type of locations stored by that data source.

Geographical locations may be classified with one or more types, e.g., by the service arrangement system 100 or a data source. Each geographical location may be simultaneously represented as various types of locations, or a record for a geographical location may include fields corresponding to different types of locations. For example, a geographical location corresponding to San Jose City Hall is classified as a POI. Additionally, San Jose City Hall has a point address of "200 E Santa Clara St, San Jose, Calif. 95113," and an address range of E Santa Clara St in between $4^{th}$ St and $6^{th}$ St. San Jose City Hall may also be classified as a landmark and/or venue. Classifications of a given geographical location may vary between different data sources, e.g., a first data source includes the point address of San Jose City Hall, and a second data source includes the address range and landmark classification of San Jose City Hall.

The map information may also include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). For the purposes of this disclosure, roads can include any route between two places that allows travel by foot, motor vehicle, bicycle, or other suitable form of travel. Examples of roads include streets, highways, freeways, trails, bridges, tunnels, toll roads, or crossings. Roads may be restricted to certain users, or may be available for public use. An intersection may be associated with two or more roads. The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

As described above, the service arrangement system 100 matches a user requesting transportation with a service provider that can transport the user from an origin location 170 to a destination location 180, in one embodiment. In an example, the service arrangement system 100 determines that the origin location 170 and the destination location 180 are located within the Data Source B Region 155. In this example, the service arrangement system 100 may determine to receive map information from Data Source B 150. Based on the map information, the service arrangement system 100 can provide routing directions to the service provider to pick up the user at the origin location 170 and to transport the user to the destination location 180. Since the origin location 170 and the destination location 180 are also located within the Data Source A Region 145, the service arrangement system 100 may determine to receive map information from Data Source A 140, e.g., in addition, or as an alternative, to map information from Data Source B 150.

II. Example System Architecture

Figure 2:
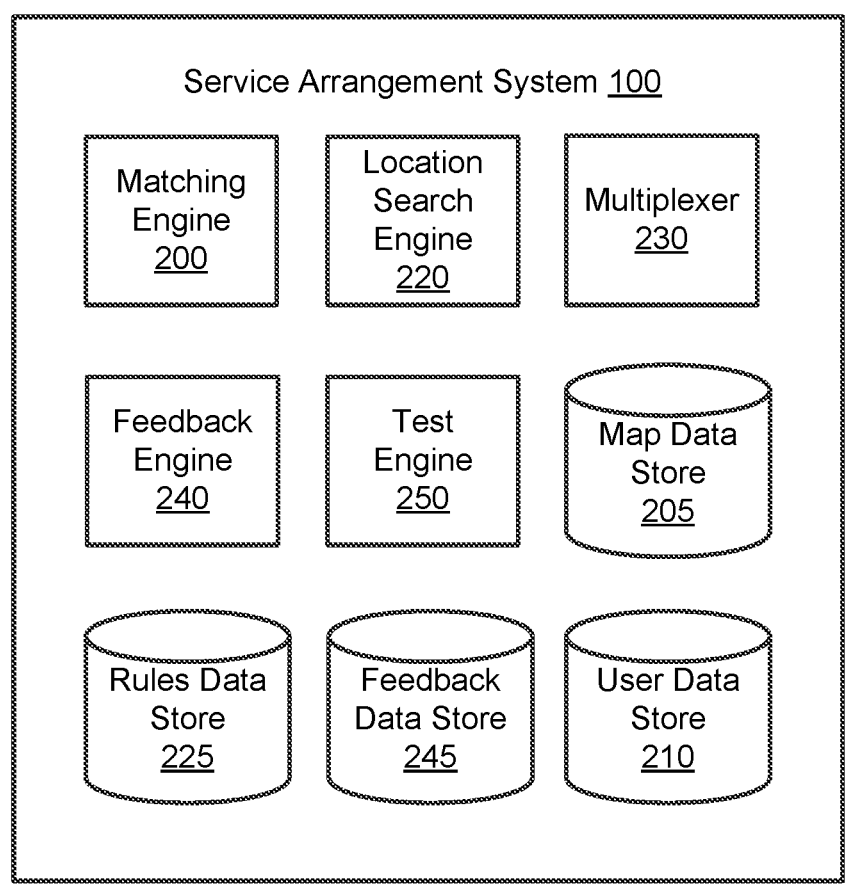
FIG. 2 is a block diagram illustrating the architecture of the service arrangement system according to one embodiment.

FIG. 2 is a block diagram illustrating the architecture of a service arrangement system 100 according to one embodiment. The service arrangement system 100 includes a matching engine 200, map data store 205, user data store 210, location search engine 220, rules data store 225, multiplexer 230, feedback engine 240, feedback data store 245, and test engine 250. In other embodiments, the service arrangement system 100 may include additional, fewer, or different components for various applications. Conventional components such as network interfaces, security functions, load balancers, failover servers, management and network operations consoles, and the like are not shown so as to not obscure the details of the system architecture.

In some embodiments, users and/or service providers use their client devices 110 to register with the service arrangement system 100, for example, by creating accounts and providing user information (e.g., contact information, a home or office address, or billing information) to the service arrangement system 100. The service arrangement system 100 stores the user information in the user data store 210. The service arrangement system 100 can associate feedback received from a user or data from trips taken by the user with the user's registered account.

The matching engine 200 selects service providers to service the requests of users. For example, the matching engine 200 receives a trip request from a user and determines a set of candidate service providers that are online, open (i.e., are available to transport a user), and near the requested origin (pickup) location for the user, e.g., based on map information from a data source. The matching engine 200 selects a service provider from the set of candidate providers to which it transmits an assignment request. The service provider can be selected based on the service provider's location, the origin and/or destination location, the type of the service provider, the amount of time the service provider has been waiting for an assignment request and/or the destination of the trip, among other factors.

In some embodiments, the matching engine 200 selects the service provider who is closest to the origin location or who will take the least amount of time to travel to the origin location (e.g., having the shortest estimated travel time to the origin location based on routing and map information from a data source). The matching engine 200 sends an assignment request to the selected service provider. If the service provider accepts the assignment request, then the matching engine 200 assigns the service provider to the user. If the service provider rejects the assignment request, then the matching engine 200 selects another service provider and sends a subsequent assignment request to the client device for that service provider.

The map data store 205 stores map information of geographic regions in which the service arrangement system 100 offers services such as transportation for users. The map data store 205 is substantially the same as the data sources 140, 150, 160 previously described with reference to FIGS. 1A-B, and with respect to the disclosure below, may be used similarly unless otherwise indicated. However, the map data store 205 is internal to the domain of the service arrangement system 100, while the data sources 140, 150, 160 may be associated with domains (e.g., from a third party system) outside the service arrangement system 100. In some embodiments, one or more of the data sources 140, 150, 160 are associated with the service arrangement system 100 and exist on separate servers or data centers, which may be located in different geographical regions, or on different hardware components in a building. The service arrangement system 100 may include multiple map data stores each including different types of map information.

The location search engine 220 provides map information in response to geographical search requests, also referred to herein as "search requests." As an example, a geographical search request is received from user searching for an origin or destination location for a trip, e.g., by inputting text for a search string via the client device 110. The map information may be represented in the form of search results, which can include any number of candidate geographical locations for the origin or destination location. For instance, if the search string is "California Street," the candidate geographical locations may be "California Street, San Francisco, Calif." and "California Street, Mountain View, Calif."

In some embodiments, the location search engine 220 selects one or more data sources from which to receive map information. For instance, as previously shown in FIG. 1A, the service arrangement system 100 can access data sources 140, 150, and 160. The service arrangement system 100 can use the multiplexer 230 to aggregate and rank map information from multiple data sources. The multiplexer 230 is further described below with reference to FIGS. 6A-C. The location search engine 220 can rank map information, and by extension, rank data sources by generating or modifying selection rules. For example, a selection rule indicates allocations of search requests to different data sources available for a given region or request, where data sources with a higher (more favorable) rank are associated with greater allocations of search requests. The location search engine 220 may store selection rules in the rules data store 225 or any other suitable database.

The location search engine 220 identifies a geographical region associated with the search request, in some embodiments. The geographical region may be based on the location of the requesting user, e.g., based on the GPS data, latitude and longitude data, or other identification information of the user's client device 110. For instance, the location search engine 220 identifies that the search request is associated with the geographical region of California. Data sources can also be associated with a geographical region.

For example, a first data source is associated with California, and a second data source is associated with New York. The location search engine 220 may select a data source based at least on the identified geographical region of the search request. In this example, since the search request is associated with the geographical region of California (e.g., based on GPS data from the requesting client device 110), the search engine 220 selects the first data source, which is also associated with California, instead of the second data source associated with New York. In response to the search string "California Street," the first data source provides candidate geographical locations such as "California Street, San Francisco, Calif." and "California Street, Mountain View, Calif.," while the second data source provides candidate geographical locations such as "California Street, Long Beach, N.Y." and "California St, Rockville Centre, N.Y." Thus, by selecting the first data source, the search engine 220 receives candidate geographical locations that are more likely to match the target geographical location corresponding to the search string.

In some embodiments, since the location search engine 220 serves as a centralized hub that can request map information from multiple data sources, the location search engine 220 in effect "proxies" search requests received by the service arrangement system 100. In other words, in response to a search request from a user's client device 110, the location search engine 220 provides multiple "proxied calls" (e.g., search requests) to the data sources. The location search engine 220 can facilitate requests to different data sources by using various application programming interfaces (APIs) customized for particular data sources. Further, the location search engine 220 can normalize search results from different data sources, e.g., by converting the search results into a common or comparable data format. The location search engine 220 may be implemented on the same server as the service arrangement system 100, though in other embodiments, some or all functionality of the location search engine 220 may be implemented on a separate proxy server for example.

II. A. Example Feedback

The feedback engine 240 receives feedback from the client device 110 of a user during a service provided by the service arrangement system 100 such as trip (or within a predetermined period of time following the trip). In some embodiments, the feedback is provided by the user and may include text, a rating (e.g., on a scale from 1-5), an indication of a positive, negative, or neutral sentiment, an audio message, graphical content, etc. The feedback may also be represented as other types of data associated with a session during which a user interacts or uses the service arrangement system 100. For example, the feedback indicates whether the user communicated with a service provider during the session or during a trip provided by the service provider, or the number of times that the user communicated with the service provider.

The feedback may also be automatically determined by the feedback engine 240 without explicit feedback from a user. For instance, the feedback engine 240 determines a duration of time between when the location search engine 200 provides search results for display to the user and when the location search engine 200 receives a selection of one of the search results from the user. As another example, the feedback engine 240 determines a duration of time that a service provider took to pick up a user from an origin location to begin a trip. The feedback engine 240 can use these example durations of time as feedback to reflect successful or unsuccessful location results. Another example type of feedback may be the number of characters input by the user for the search string before the location search engine 200 receives a selection of one of the search results from the user.

In some embodiments, the feedback engine 240 receives feedback from a data source. The data source may provide a metric representing the quality of search results provided by the data source. For example, the metric is a confidence level indicating that the data sources determines that there is a 90% probability that at least one of the candidate geographical locations in the search results matches the search string of the corresponding request for the search results.

As yet another example, the feedback engine 240 may determine feedback based on churn rate information. The churn rate of the service arrangement system 100 represents a metric of the percentage of users who stop using the service arrangement system 100. The feedback engine 240 can determine the churn rate based on the number of users who have not requested service from a service provider of the service arrangement system 100 for a predetermined period of time (e.g., a month or a year). When the churn rate differs significantly between data sources, it may reflect a poor experience finding locations with a data source. The feedback engine 240 may start timing the predetermined period of time subsequent to the most recent session when user used the service arrangement system 100, e.g., by requesting transportation for a trip. Feedback associated with churn rate information may also indicate the data source that was used for the most recent trip(s), e.g., the location search engine 220 used map information from the data source to determine the origin or destination location of the trip, or to generate routing directions for the trip.

In some embodiments, the feedback engine 240 determines a context of a feedback. The context may be related to location or navigation, for example, the service provider went to an incorrect origin or pickup location; the service provider transported a user to an incorrect destination location; the user could not find a particular origin or destination location using the service arrangement system 100 (e.g., a search for an address resulted in no search results or poor quality search results); or the service arrangement system 100 provided inefficient routing directions (e.g., not the route with the shortest distance or least travel time required to travel from the origin to destination location). Other contexts may be related to safety, service provider quality, vehicle operation, etc. The feedback engine 220 may store the feedback and the corresponding context in the feedback data store 245 and associates the feedback with the corresponding trip.

In example use cases where the feedback includes text (e.g., input by the user via using a keyboard interface or generated using voice-to-text processing), the feedback engine 240 analyzes the text using natural language processing (NLP) techniques (e.g., lexical analysis, syntactic analysis, semantic analysis, information retrieval, sentiment analysis, stemming, fuzzy matching, anaphora resolution, etc.) to determine context of the feedback. For instance, the feedback engine 240 determines that a feedback is associated with a location-related context if text of the feedback includes keywords or phrases such as "wrong drop-off location," "can't find address," or "slow pickup."

In some embodiments, the feedback engine 240 generates aggregate data or trends based on historical feedback data. For instance, the aggregate data indicates the average time it takes for a service provider to pick up a user at the origin location for trips when the location search engine 220 determines the origin location based on a given data source. The aggregate data may be categorized based on the time of day, type of service, service provider information, or other parameters. Additionally, a trend can indicate a temporal aspect of the historical feedback data. For example, the average user pick-up time for the given data source has gradually decreased by a certain percentage over the past year, e.g., indicating that map information of the given data source is improving in quality over time.

II. B. Example A/B Testing

The test engine 250 performs tests to modify or generate selection rules used by location search engine 220 to select data sources. In particular, the service arrangement system 100 receives information about service provided by service providers to riders or feedback from users, the test engine 250 can use the information or feedback to modify or generate selection rules. In some embodiments, the test engine 250 performs many automated A/B tests to determine which data sources have higher quality, e.g., provide search results that are more likely to include accurate candidate geographical locations corresponding to a target geographical location of a search request. The test engine 250 may categorize the A/B tests based on various factors such as the geographical region, type of geographical location (e.g., of the destination or origin location), time of day, etc.

In an example A/B test, the test engine 250 identifies a selection rule that allocates 50% of search requests to a first data source and the other 50% of the search results to a second data source. After performing a number of A/B tests, the test engine 250 determines that the first data source provides higher quality search results for target geographical locations, relative to the quality of search results provided by the second data source. The test engine 250 may determine these qualities of data sources based on (a) information about a trip provided by a service provider to the user and/or (b) comparing the feedback received between users who were provided search results from the first data source and users who were provided search results from the second data source.

For instance, the service arrangement system 100 determines that positive feedback (indicative of high quality) is received when the location search engine 220 provided search results from the first data source (or used map information from the first data source to generate routing directions for the trip). On the other hand, the service arrangement system 100 determines that negative feedback (indicative of low quality) is received when the location search engine 220 provided search results from the second data source. Based on this comparison, the test engine 250 modifies the selection rule to allocate 100% of search requests to the first data source and 0% of the search results to the second data source. As another example, if a third data source tested in the AB test had a quality level in between the quality levels of the first and second data sources, the test engine 250 modifies the selection rule to allocate 80% to the first data source, 0% to the second data source, and 20% to the third data source. Thus, the test engine 220 increases allocations to data sources associated with high quality and decreases allocations to data sources associated with low quality, in some embodiments.

Several examples of positive feedback include: a user pick-up time from an origin location for a trip being less than a threshold pick-up duration such as 5 or 10 minutes, a trip being within a threshold pick-up duration such as 1 or 2 minutes, user input such as a user selection or text feedback indicating a "smooth trip" or "fast pickup," receiving search results with greater than a threshold number of candidate geographical locations, a duration of time for the user to select one of the search results being less than a threshold search duration such as 30 seconds or 1 minute, a number of characters input by a user for a search string being less than a threshold character number such as 5 or 10 characters, or a low churn rate for a data source.

Several examples of negative feedback include: a user pick-up time being greater than the threshold pick-up duration, text feedback from a user such as "wrong drop-off location" or "waited too long for pickup," receiving search results with less than the threshold number of candidate geographical locations, a duration of time for the user to select one of the search results being greater than a threshold search duration, a number of characters input by a user for a search string being greater than the threshold character number, a high churn rate for a data source, or information indicating that a user communicated with personnel of the service arrangement system 100, e.g., because the user experienced difficulties to request service or during the provided service.

In some embodiments, the test engine 250 performs iterative A/B tests using randomized controlled experiments. By running optimization experiments over time with different data sources, users, and/or geographical locations of search requests, the test engine 250 learns which particular data sources are correlated with higher quality of service provided by the service arrangement system 100, in the context of information describing the service and feedback from the feedback engine 240. Thus, the test engine 250 can design more targeted tests to modify or generate selection rules for allocating search requests to data sources.

As another example, the test engine 250 uses A/B tests to determine that a first data source provides higher quality for restaurant type POI target geographical locations, while a second data sources provides higher quality for hiking and biking trail types of POI target geographical locations. The test engine 250 generates a selection rule that allocates more search requests of restaurant type geographical locations to the first data source, and that allocates more search requests of hiking or biking type geographical locations to the second data source.

In some embodiments, the test engine 250 performs continuous A/B testing by providing a minimum allocation of search results (e.g., 1% or 5%) to a given data source. Based on the test results, the test engine 250 can receive information indicating the efficacy (e.g., quality of service) of the given data source. Thus, if the efficacy of the given data source improves over time, the test engine 250 can detect the improvement and modify a selection rule to increase the allocation of search results to the given data source.

In some embodiments, the test engine 250 uses feedback from the feedback engine 240 and/or other information from A/B testing to train machine learning models that can determine the quality of search results from different data sources. In an example, a machine learning model determines selection rules for allocating search requests based on the determined qualities of search results from data sources. For instance, if the machine learning model determines that a first data source has higher quality search results than a second data source, the machine learning model determines that more search requests should be allocated to the first data source than to the second data source. Thus, the location search engine 220 can use this determination for fallback logic to select between the first and second data sources.

Based on the results of the A/B test experiments, the test engine 250 can also determine which experiments to scale up, e.g., to allocate a greater number of search request from a larger population of users to a given data source. In scaled experiments, the test engine 250 can target a larger population of users requesting service from a geographical region, and provide search results from a data source that has been found to provide high quality search results for other users from the geographical region.

While example embodiments are described above in the context of AB testing, it will be appreciated that alternative embodiments can include more the two different treatments. Additionally or alternatively, it will be appreciated that alternative embodiments need not be testing experiments, but simply utilizing two different treatments.

III. Example Sequence Diagrams for Providing Search Results

III. A. Selecting a Data Source Using Selection Rules

Figure 3A:
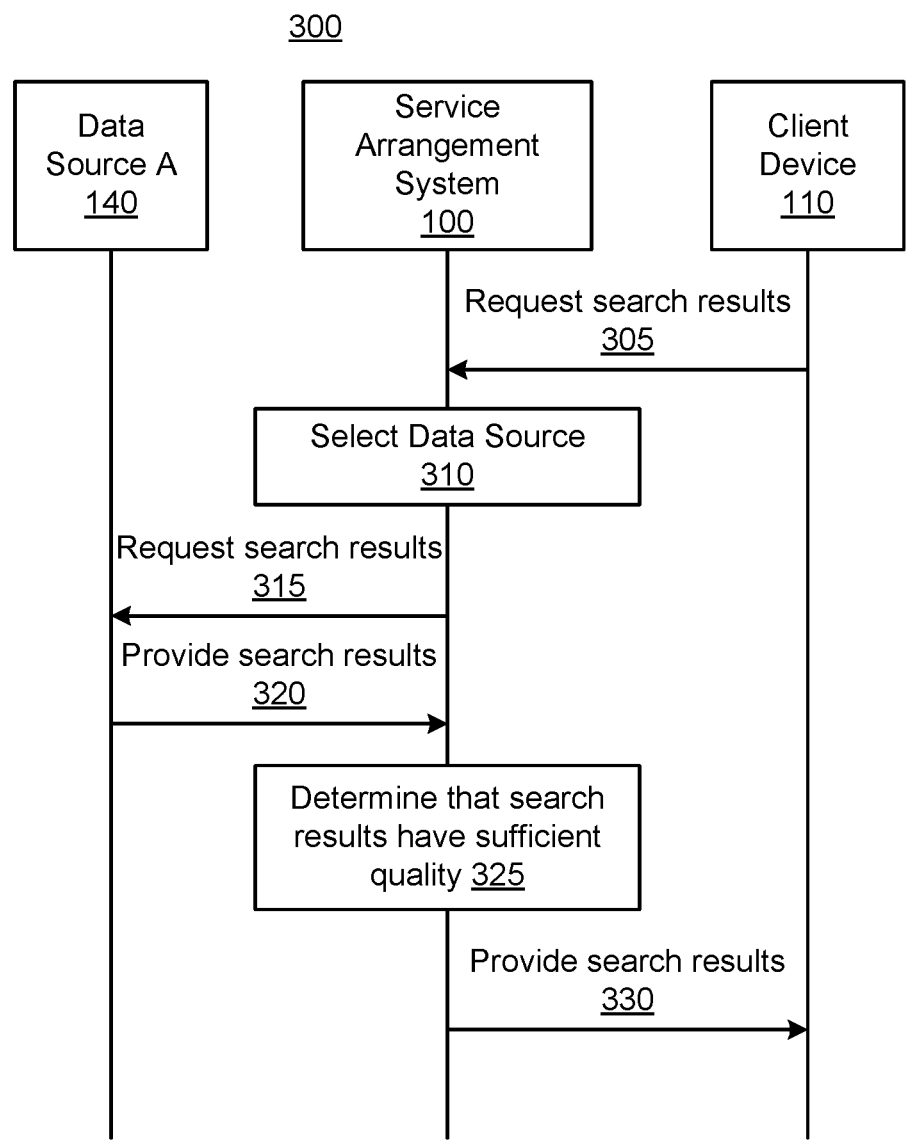
FIG. 3A is a sequence diagram for providing search results from a data source according to one embodiment.

FIG. 3A is a sequence diagram 300 for providing search results from a data source according to one embodiment. In the example use case shown in FIG. 3A, the client device 110 requests 305 search results from the service arrangement system 100. The location search engine 220 selects 310 a data source and requests 315 search results from the selected data source. The location search engine 220 may select between data sources based on selection rules associated with multiple data sources accessible by the service arrangement system 100. As previously shown in FIG. 1A, the service arrangement system 100 has access to data sources 140, 150, 160. For purposes of illustration, only data source A 140 is shown in FIG. 3A.

In some embodiments, the selection rules indicate allocations of search requests to the data sources. For instance, the allocations include percentages of search request to allocate to each of the data sources, e.g., 70% to Data Source A 140, 30% to Data Source B, and 0% to Data Source C 160. In other words, the location search engine 220 selects Data Source A 140 for 70% of the received search requests, Data Source B 150 for 30% of the received search requests, and Data Source C 160 for 0% of the received search requests.

In some embodiments, the selection rules indicate a threshold value for a given data source. For example, the threshold value indicates the maximum number of search requests that the location search engine 220 should allocate to the given data source, e.g., during a certain duration of time such as an hour, a day, a month, etc.

The selected Data Source A 140 provides 320 search results to the service arrangement system 100 in response to the request for the search results. The location search engine 220 determines 325 that the search results have sufficient quality, in some embodiments. In one embodiment, the location search engine 220 determines the quality of the search results based on the number of candidate geographical locations in the search results. For instance, the location search engine 220 determines that the search results have sufficient quality if the number of candidate geographical locations is greater than a threshold value. Since the location search engine 220 determines that the results have sufficient quality, the location search engine 220 provides 330 the search results to the client device 110 in response to the request for search results of the client device 110. In other examples, if the location search engine 220 determines that the results have insufficient quality, the service arrangement system 100 has the capability to fallback to an alternate data source, which is further described below.

III. B. Selecting an Alternate Data Source

Figure 3B:
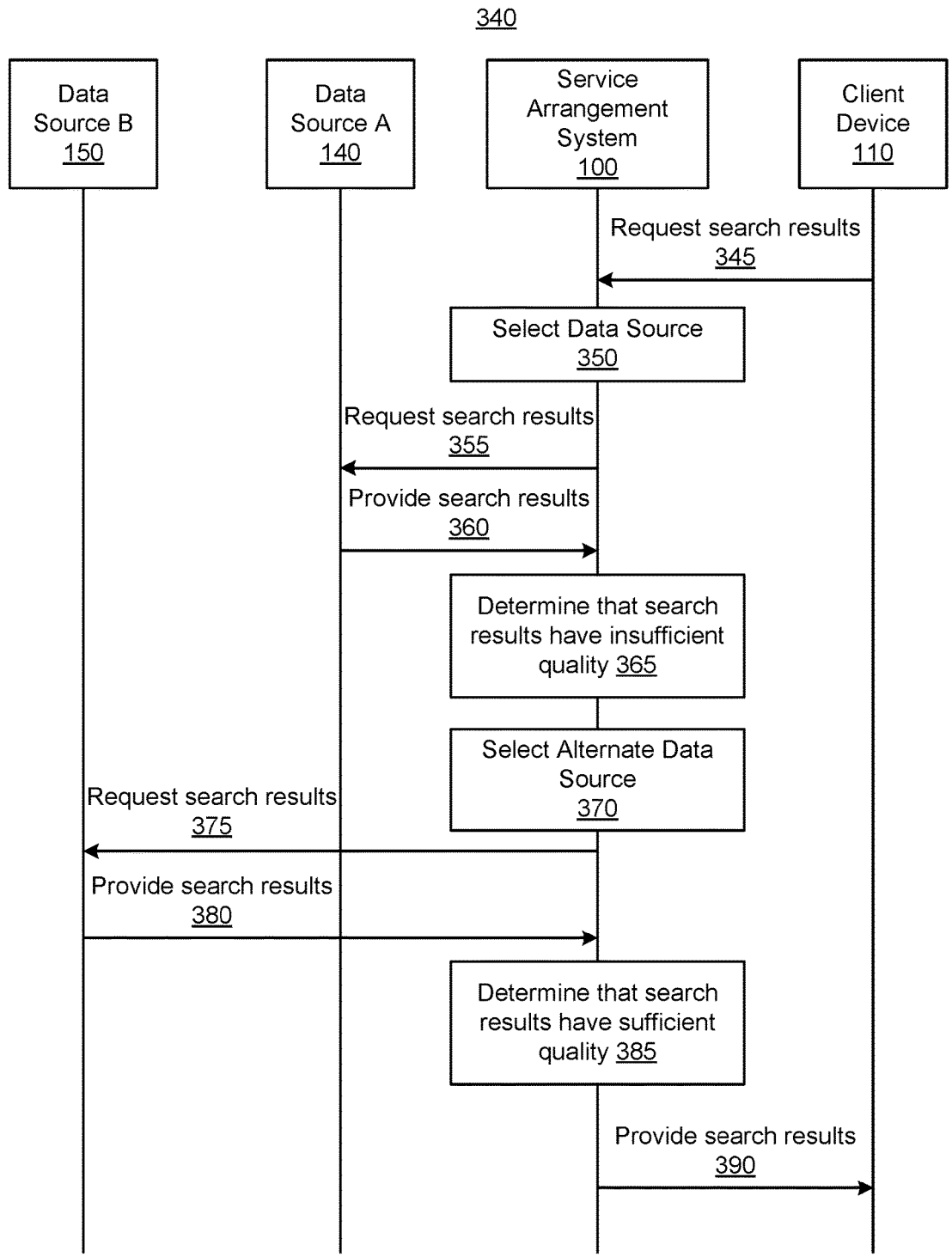
FIG. 3B is a sequence diagram for selecting an alternate data source from which to provide search results according to one embodiment.

FIG. 3B is a sequence diagram 340 for selecting an alternate data source from which to provide search results according to one embodiment. In the example use case shown in FIG. 3B, the client device 110 requests 345 search results from the service arrangement system 100. The location search engine 220 selects 350 a data source and requests 355 search results from the selected data source. The selected Data Source A 140 provides 360 search results to the service arrangement system 100. The location search engine 220 determines 365 that the search results have insufficient quality. For instance, the location search engine 220 determines that the search results have insufficient quality if the number of candidate geographical locations is less than a threshold value.

In response to the determination that the search results from Data Source A 140 have insufficient quality, the location search engine 220 selects 370 an alternate data source and requests 375 search results from the alternate data source. In some embodiments, the location search engine 220 selects alternate data sources based on selection rules, e.g., fallback logic. For example, referring back to the selection rules previously described in FIG. 3A, the location search engine 220 selects Data Source B 150 because Data Source B 150 has the second greatest percentage allocation, 30%, compared to the 70% allocation of Data Source A 140.

As another example, the location search engine 220 has already selected Data Source A 140 equal to the maximum number of search requests within an hour time period, e.g., according to logic for load-shedding or load-balancing. Thus, the location search engine 220 will not select the Data Source A 140 to query for subsequent search requests during the hour time period. Rather, the location search engine 220 selects an alternate data source that has not reached the corresponding maximum number of search requests for a given duration of time. An example use case of selecting an alternate data source is described below with reference to FIG. 4.

The selected alternate Data Source B 150 provides 380 search results to the service arrangement system 100. The location search engine 220 determines 385 that the search results have sufficient quality. In response to the determination, the service arrangement system 100 provides the search results to the client device 110, e.g., for display to the user.

In some embodiments, a selection rule indicates a 100% allocation to a first data source, and another selection rule indicates 100% allocation to a second data source if the first data source is unavailable, e.g., the first data source has reached its maximum number of search requests. Additionally, the selection rule may indicate a change in the allocations as a data source approaches its maximum number of search requests. For instance, if the first data source reaches 90% of its maximum number of search requests, the selection rule indicates that the percentage allocation to the first data source is decreased from 70% to 10%.

In some embodiments, a selection rule is based on the latency of a data source. The latency represents the duration of time a data source requires to provide search results in response to a search request. For instance, as a data source receives an influx of a large number of search requests during a short period of time, a computer server of the data source may be constrained by the availability of computational resources to process the influx of search requests (e.g., saturated thread pools, high CPU or memory usage, delayed messages, or port exhaustion). Consequently, the latency of the computer server increases, which may result in a poor user experience because the user would need to wait a longer duration to receive search results after inputting a search request.

As another example, the location search engine 220 implements a "circuit breaker" to facilitate fault-tolerant operation of the service arrangement system 100. In particular, a selection rule indicates that if the data source has not provided search results within the timeout duration from receiving the corresponding search request, the location search engine 220 selects an alternate data source (e.g., the data source with the next greatest percentage allocation). Thus, the location search engine 220 isolates faults (e.g., a data source that times-out) without interrupting the operation of the service arrangement system 100 to provide search results.

The selection rules for fallback logic, load-shedding, or load-balancing described above can provide a technical advantage by reducing the latency of the service arrangement system 100 between receiving a search request and providing search results to the user.

IV. Example Search String

FIG. 4 is a diagram of a sequence of search strings according to one embodiment. In an example use case, the string of text "Tahoe" is separated into five different search strings as shown in the left column of FIG. 4, where each successive search string in the sequence includes another character of the text. Since a user may input the string of text via the client device character-by-character or word-by-word (e.g., using haptic input via a touchscreen keyboard or using voice input via a microphone), the sequence of search strings represents the temporal aspect of the user's input.

The location search engine 220 may generate search requests for each search string in the sequence and provide search results (if any) from a data source. As shown in the right column of FIG. 4, the search results may change between different search strings. In particular, the search results for search string "T" include addresses (e.g., candidate geographical locations) for "The Waterfront" and for "The SF Hotel" because the name of these addresses each start with the string "T." The search results are provided by a data source associated with the geographical region of the San Francisco Bay Area, and "The Waterfront" and "The SF Hotel" are each located in the San Francisco Bay Area.

Following in the same example use case, the search results for search string "Ta" includes the addresses for the "Taco Shop" and "Table Shop" located in the San Francisco Bay Area because the name of these addresses each start with the string "Ta." The location search engine 220 can determine the quality of search results based on various heuristics or other rules to evaluate the search results from a data source. As one example heuristic, a result can be evaluated by the number of characters (e.g., consecutive characters) of the search string that match the start of the name of the candidate geographical location. Thus, the location search engine 220 determines that search results including addresses for "Taco Shop" and "Table Shop" have a greater quality than search results including addresses for "The Waterfront" and "The SF Hotel" because the former has two characters matching while the latter has one character matching. The location search engine 220 may also match characters of the search string with portions of the candidate geographical location. For instance, if the search string is "Sh," the location search engine 220 may match the search string with the address for "Taco Shop" because the second word in the name of the store starts with "Sh."

Following in the above example, the user inputs an additional character "h" that corresponds to the search string "Tah." The location search engine 220 queries the previously used data source associated with the geographical region of the San Francisco Bay Area (for the search strings "T" and "Ta") to provide search results for the search string "Tah." However, the data source provides an empty set of search results (or low quality search results as determined based on a criterion) when queried with the search string "Tah," e.g., because the data source does not include candidate geographical locations that include the string "Tah." Thus, the location search engine 220 selects an alternate data source associated with the Lake Tahoe geographical region and requests search results using the search string "Tah" from the alternate data source.

In response to receiving the request, the alternate data source provides new search results including candidate geographical locations for "Truckee Tahoe Airport-TRK" and "The Lake Tahoe Hotel" because the names of the candidate geographical locations include the search string "Tah" (not necessarily at the beginning of the name). Furthermore, "Truckee Tahoe Airport-TRK" and "The Lake Tahoe Hotel" are each located in the Lake Tahoe geographical region. The location search engine 220 may determine that the new search results from the alternate data source have sufficient quality because the new search results include at least one candidate geographical location for the search string. For purposes of illustration, the dotted line in FIG. 4 indicates the transition to the alternate data source selected by the location search engine 220. The location search engine 220 also requests search results from the alternate data store using the search strings "Taho" and "Tahoe" because the names of the candidate geographical locations "Truckee Tahoe Airport-TRK" and "The Lake Tahoe Hotel" also each include the search strings "Taho" and "Tahoe."

By evaluating the quality of the search results during entry of the search query (e.g., as the user types "Tahoe") the location search engine 220 may seamlessly transition to (e.g., fall back to) other data sources and maintain the appearance to the user that a single user source may have been used, and the results relating to "Truckee Tahoe Airport" were not sufficiently relevant until the search string "Tah." In addition, the location search engine 220 may determine to transition to other data sources if the number of search results from the currently used data source is below a threshold value. Thus, when the transition occurs, there is not a significant change in the number of search results. For example, the user is more likely to notice a change from one to ten search results, but not notice a change from nine to ten search results.

In some embodiments, the location search engine 220 provides the candidate geographical locations to the client device 110 for communication to the user, e.g., via a visual display and/or audio signal. In an example where the client device 110 displays names (or other associated text) of the candidate geographical locations, the location search engine 220 may provide a command to the client device 110 to graphically indicate portions of the names that match the search string. For instance, as shown in the right column of FIG. 4, the matching portions are bolded and underlined. Further, the location search engine 220 may provide the candidate geographical locations to the client device 110 for display while the user is inputting a search string. For instance, the client device 110 displays the search results for the search string "T" before the user inputs the second character "a" of the string of text "Tahoe." Accordingly, the location search engine 220 can provide autocomplete search functionality for the user. In other words, the location search engine 220 predicts the search string that the user intends to input prior to the user inputting the complete search string.

V. Example Buffer Region of Data Sources

Figure 5:
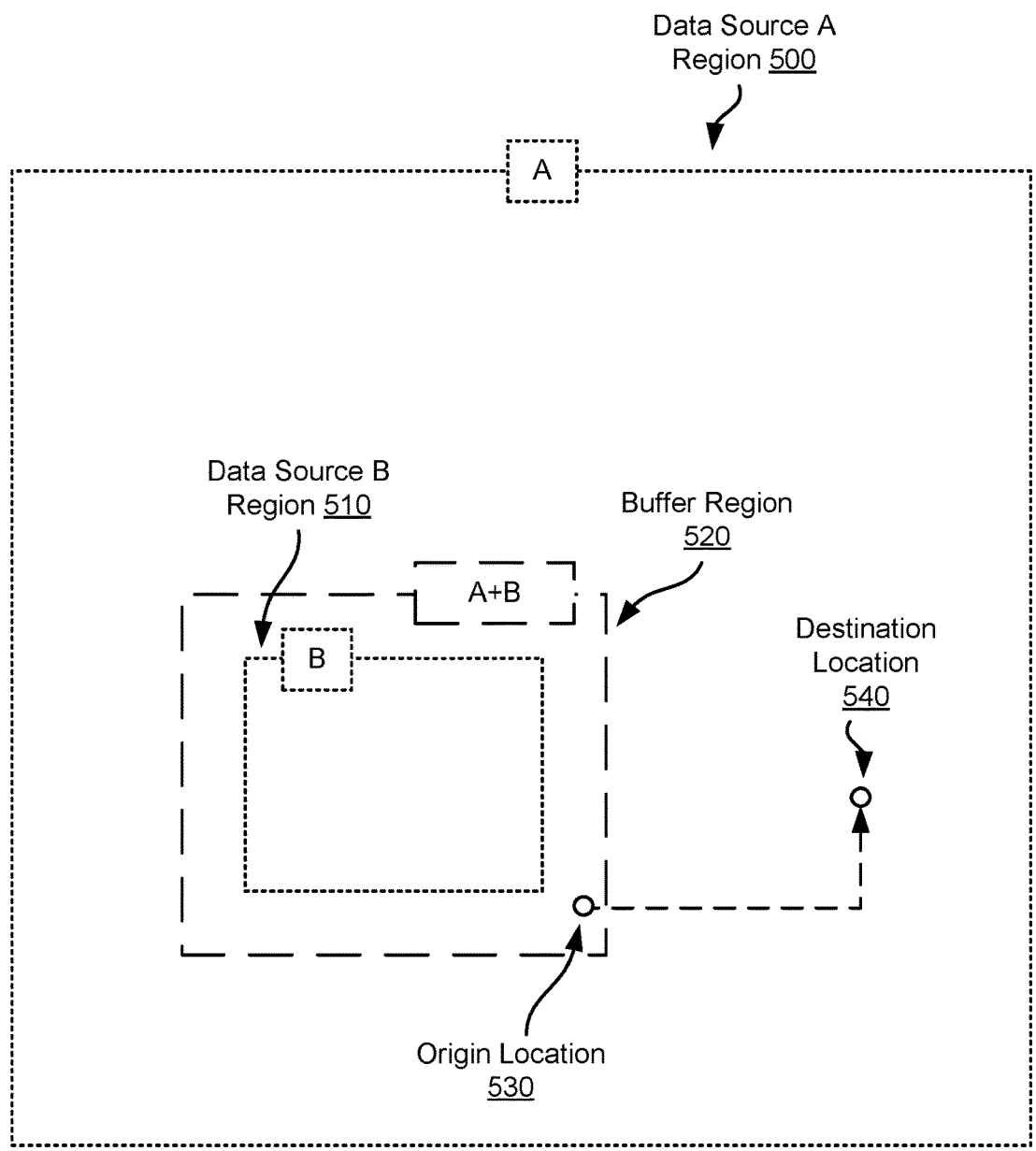
FIG. 5 is a diagram illustrating a buffer region covered by data sources according to one embodiment.

FIG. 5 is a diagram illustrating a buffer region 520 covered by data sources according to one embodiment. A first data source and a second data source provide map information associated with the Data Source A Region 500 and the Data Source B Region 510, respectively. The buffer region 520 includes the geographical region within a threshold distance of the Data Source B Region 510 and also located within the Data Source A Region 500.

In one embodiment, the location search engine 220 selects the first data source to provide map information for search strings associated with target geographical locations located within the Data Source A Region 500 (and optionally also not located within the Data Source Region B). Additionally, the location search engine 220 selects the second data source to provide map information for search strings associated with target geographical locations located within the Data Source Region B 510. In some embodiments, if the target geographical location is located within the buffer region 520, the location search engine 220 may receive search results from one or both of the first and second data sources. The location search engine 220 may aggregate and rank the search results from each of the two data sources. Further details regarding the ranking of search results are further described below with reference to FIGS. 6A-C.

In the embodiment shown in FIG. 5, the origin location 530 of a trip requested by a user using the service arrangement system 100 is located within the buffer region 520, while the destination location 540 of the trip is located in Data Source A Region 500. The location search engine 220 requests search results from both the first and second data sources to increase the likelihood that the search results will include accurate candidate geographical locations that correspond to the origin and/or destination locations, e.g., when the client device 110 originating the request is located in the buffer region 520. For instance, the origin location 530 may be the address of a school that is not included in the first data source even though the address is located within the Data Source A Region 500. The origin location 530 is located within the buffer region 520, so the second data source includes the address of the school, e.g., because a given data source may include additional map information for "buffer regions" surrounding the boundary of the coverage location of the given data source. In some embodiments, the location search engine 220 generates and/or provides routing instructions to the user or a service provider providing transportation for the trip based on map information from one or both of the first and second data sources.

VI. Example Ranking Architecture of Multiplexer

Figure 6A:
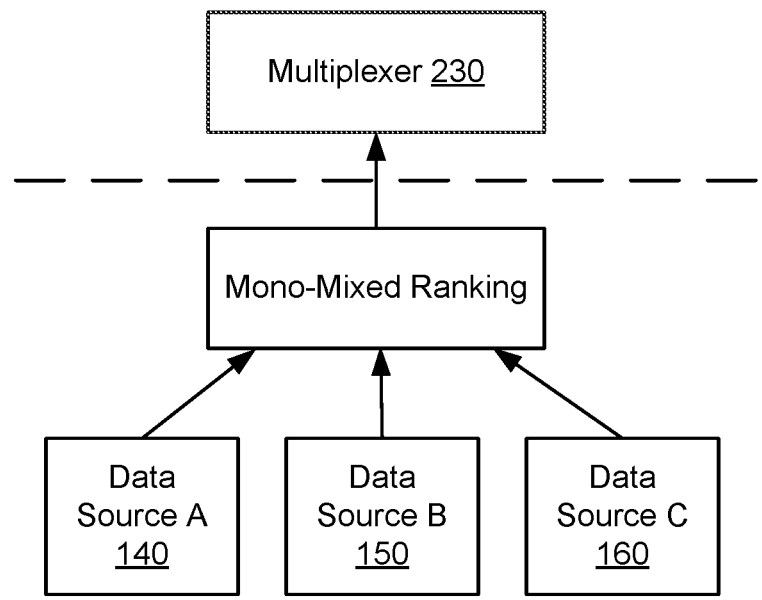
FIG. 6A is a diagram illustrating mono-mixed ranking of data sources according to one embodiment.
Figure 6B:
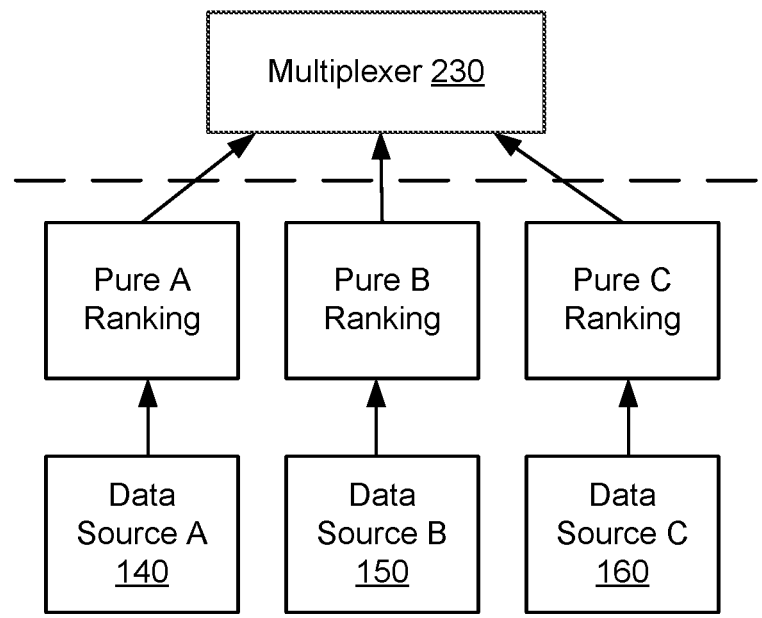
FIG. 6B is a diagram illustrating pure ranking of data sources according to one embodiment.
Figure 6C:
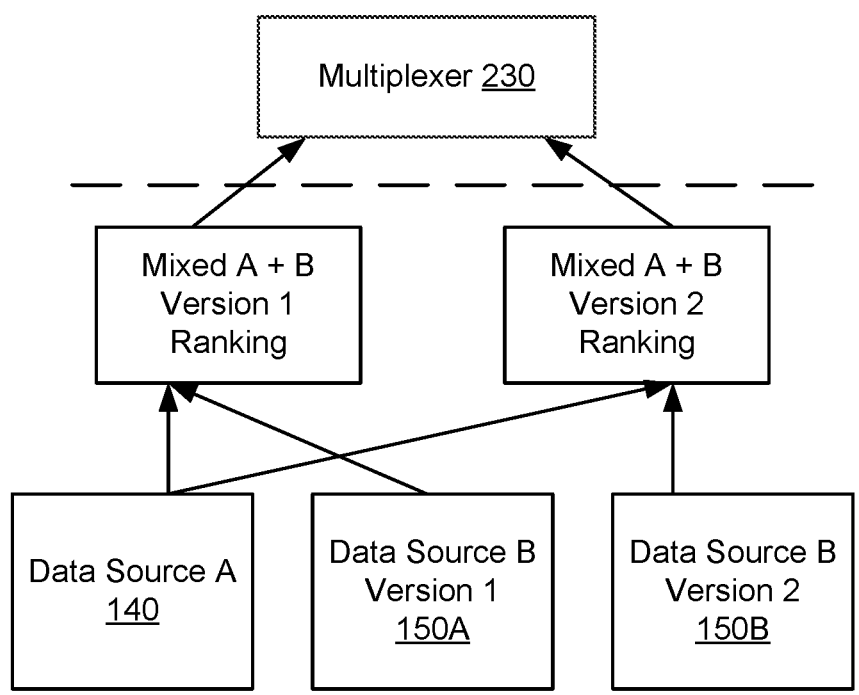
FIG. 6C is a diagram illustrating mixed ranking of data sources according to one embodiment.

In some embodiments, the location search engine 220 uses the multiplexer 230 to aggregate and rank map information and search results from the data sources. FIGS. 6A-C illustrate different ranking architectures that may be implemented by the service arrangement system 100.

FIG. 6A is a diagram illustrating mono-mixed ranking of data sources according to one embodiment. In the example shown in FIG. 6A, the multiplexer 230 aggregates search results from each of Data Source A 140, Data Source B 150, and Data Source C 160. The location search engine 220 uses the multiplexer 230 to rank the aggregated search results based on selection rules.

FIG. 6B is a diagram illustrating pure ranking of data sources according to one embodiment. In the example shown in FIG. 6B, the multiplexer 230 ranks search results from each of Data Source A 140, Data Source B 150, and Data Source C 160 and aggregates the ranked search results. In contrast to the "mono-mixed ranking" architecture shown in FIG. 6A, in the "pure ranking" architecture shown in FIG. 6B, the multiplexer 230 independently ranks search results from the data sources. Thus, the multiplexer 230 can rank search results of a data source at a different frequency than that of another data source, or use different selection rules based on the particular data source.

FIG. 6C is a diagram illustrating mixed ranking of data sources according to one embodiment. In the example shown in FIG. 6C, the multiplexer 230 ranks a first set of search results from Data Source A 140 and Data Source B Version 1 150A, and ranks a second set of search results from Data Source A 140 and Data Source B Version 2 150B. The multiplexer 230 aggregates the ranked search results from the two sets. In contrast to the prior two architectures, the "mixed ranking" architecture shown in FIG. 6C ranks sets of search results from different combinations of data sources. Further, the combinations of data sources may include different versions of search results from the same data source. For instance, Data Source B 150 can provide a Data Source B Version 1 150A and Data Source B Version 2 150B. Though not shown in FIGS. 6A-B, "mono-mixed ranking" and "pure ranking" architectures may also use different versions of search results from a data source.

In one embodiment, the service arrangement system 100 implements a "golden ranking" for production, which represents the latest optimized ranking based on a set of selection rules, which may be a subset of all selection rules stored in the rules data store 225. In other words, the location search engine 220 determines that the "golden ranking" is provides search results with a higher quality (e.g., on average) compared to the quality of any other known ranking by the location search engine 220. Thus, the location search engine 220 uses the "golden ranking" to provide search results to users during regular use of the service arrangement system 100.

In contrast, the location search engine 220 uses an alternate ranking (e.g., a mixed ranking as shown in FIG. 6C) to provide search results to users for A/B tests. If the test engine 250 determines that the quality of search results using the alternate ranking is greater than a threshold quality level, the location search engine 220 may modify the "golden ranking" based on the alternate ranking. Thus, the service arrangement system 100 can test different rankings with a smaller subpopulation of users before incorporating higher performing rankings into the "golden ranking" used to provide service to a larger population of users during normal use.

VII. Example Process Flows

VII. A. Selecting a Data Source Using Selection Rules

Figure 7:
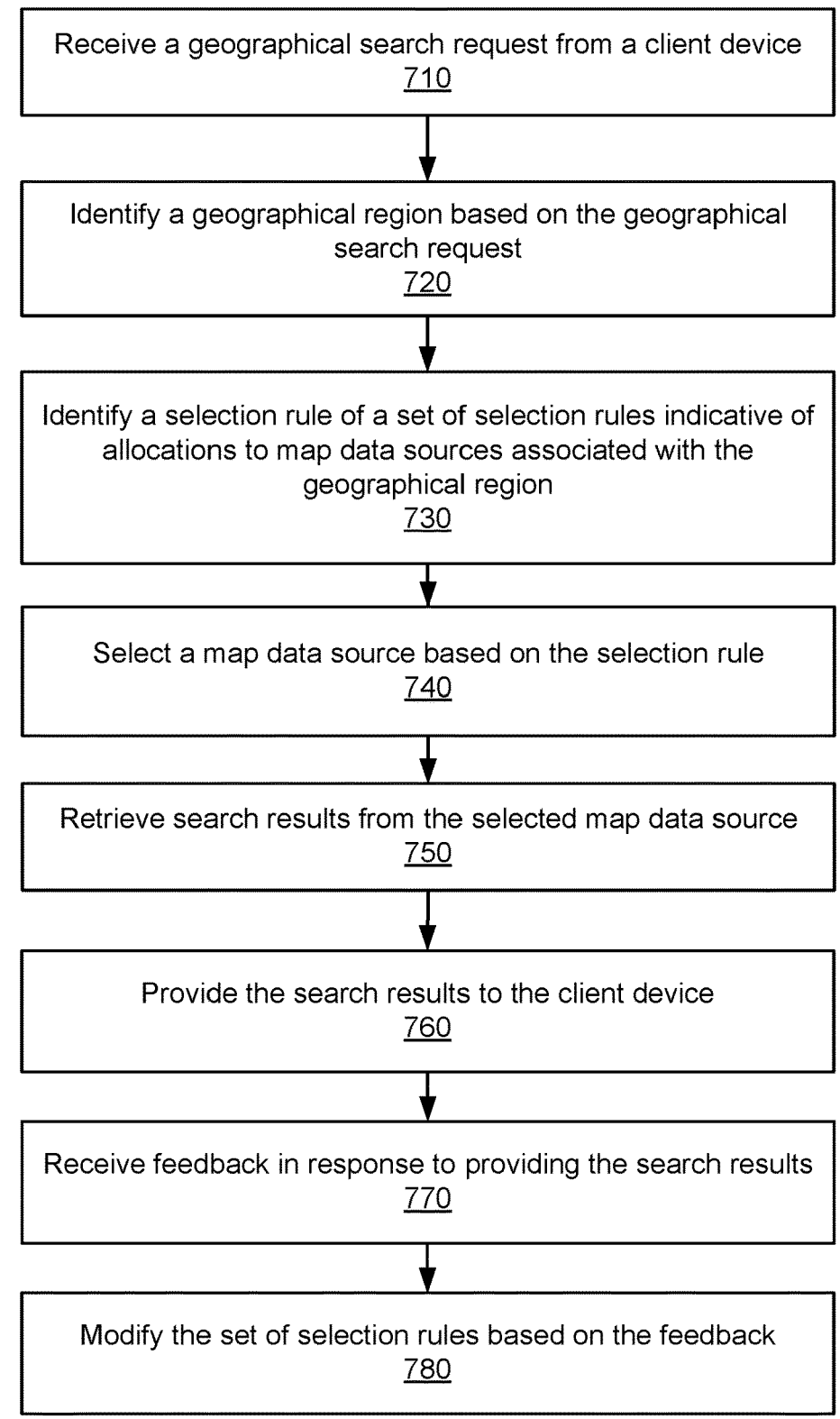
FIG. 7 is a flowchart illustrating a process for modifying allocations of search requests to data sources according to one embodiment.

FIG. 7 is a flowchart illustrating a process 700 for modifying allocations of search requests to data sources according to one embodiment. In some embodiments, the process 700 is used by the service arrangement system 100—e.g., modules of the service arrangement system 100 described with reference to FIG. 2—within the system environment in FIG. 1A. The process 700 may include different or additional steps than those described in conjunction with FIG. 7 in some embodiments or perform steps in different orders than the order described in conjunction with FIG. 7.

In one embodiment, the service arrangement system 100 receives 710 a geographical search request from a client device 110 of a user of the service arrangement system 100. The location search engine 220 identifies 720 a geographical region based on the geographical search request, for example, based on geographical location information of the client device 110 such as GPS data, a UUID, or historical geographical data, e.g., a geographical region from which the client device 110 previously provided search requests to the service arrangement system 100.

The location search engine 220 identifies 730 a selection rule, e.g., from a set of multiple selection rules, indicative of allocations of geographical search requests to map data sources associated with the geographical region. In some embodiments, the location search engine 220 registers a target map data source with the service arrangement system 100 by receiving information associated with the target map data source such as a corresponding target geographical region. The location search engine 220 includes the target map data source in a set of map data sources associated with the target geographical region. For instance, the set includes a map data source with map information of restaurants in the San Francisco Bay Area and another map data source with map information of parks in the San Francisco Bay Area; the target map data source includes map information of public transit stations in the San Francisco Bay Area. By aggregating map information from the different map data sources, the service arrangement system 100 can have a more comprehensive set of map information. The location search engine 220 modifies selection rules associated with the San Francisco Bay Area to allocate search requests to the target map data source. Prior to registering the target map data source, the selection rules associated with the San Francisco Bay Area may already allocate search requests to other map data sources in the set.

The location search engine 220 uses one or more processors to select 740 a map data source based on the selection rule. The location search engine 220 retrieves 750 search results from the selected map data source. The location search engine 220 provides 760 the search results from the selected map data source to the client device 110 for display. The service arrangement system 100 can use the search results for a trip provided to the user by a service provider, e.g., the location search engine 220 receives a selection by the user of the origin and/or destination location of the trip based on the displayed search results. The feedback engine 240 receives 770 feedback in response to providing the search results. The location search engine 220 modifies 780 the set of selection rules (e.g., at least one of the selection rules) based on the feedback.

VII. B. Selecting an Alternate Data Source

Figure 8:
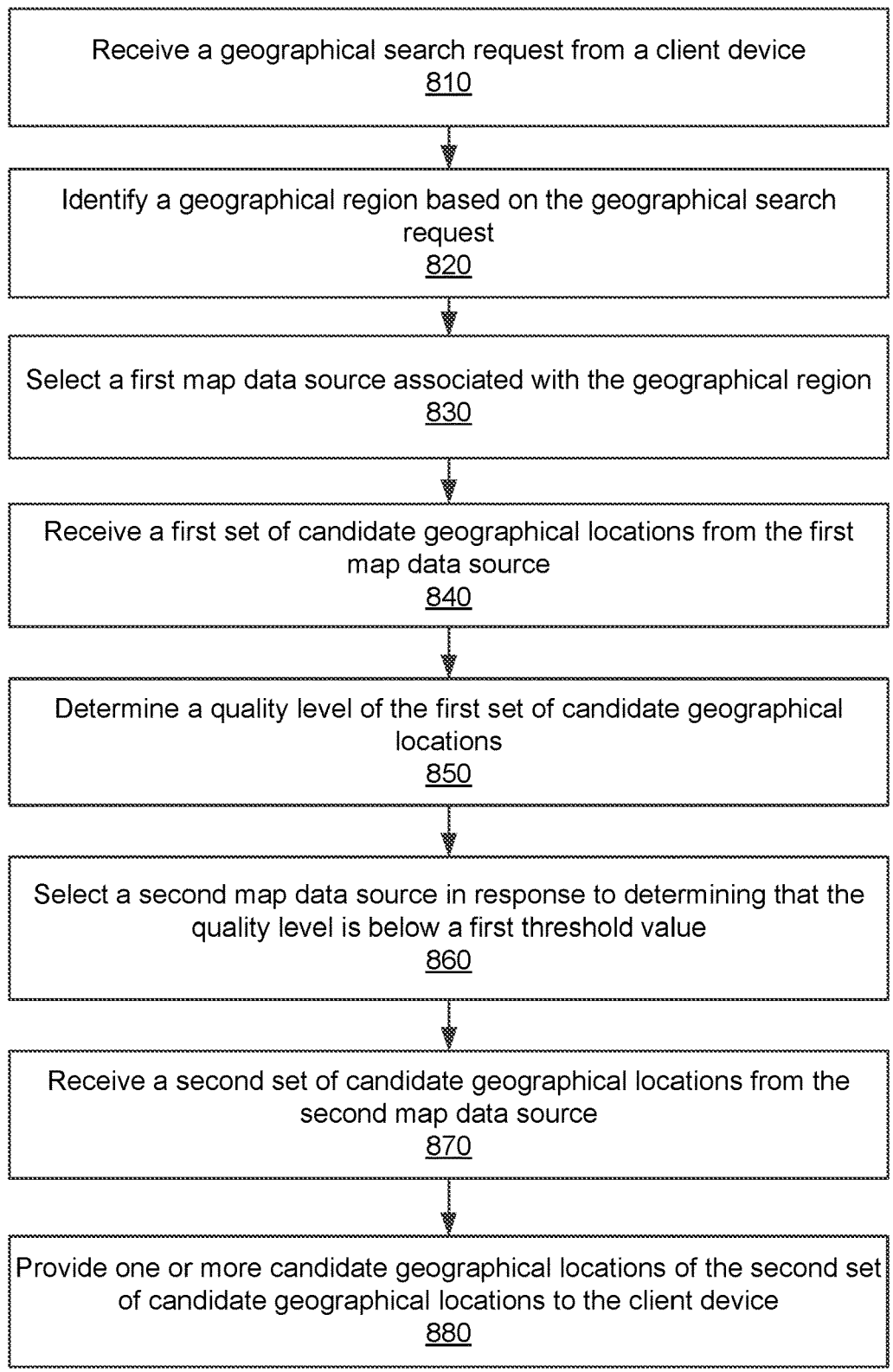
FIG. 8 is a flowchart illustrating a process for selecting a data source from which to provide search results according to one embodiment.

FIG. 8 is a flowchart illustrating a process 800 for selecting a data source from which to provide search results according to one embodiment. In some embodiments, the process 800 is used by the service arrangement system 100—e.g., modules of the service arrangement system 100 described with reference to FIG. 2—within the system environment in FIG. 1A. The process 800 may include different or additional steps than those described in conjunction with FIG. 8 in some embodiments or perform steps in different orders than the order described in conjunction with FIG. 8.

In one embodiment, the service arrangement system 100 receives 810 a geographical search request from a client device 110 of a user of the service arrangement system 100. The geographical search request corresponds to a target geographical location such as the origin or destination location of a trip that the user is requesting from the service arrangement system 100. Additionally, the geographical search request may include a sequence of characters input by the user to search for the target geographical location. The location search engine 220 identifies 820 a geographical region based on the geographical search request.

The location search engine 220 selects 830 a first map data source from a set of map data sources associated with the geographical region. In some embodiments, the location search engine 220 selects the first map data source based on a set of geographical locations retrieved from the client device 110. For instance, the set includes geographical locations of search requests that the client device 110 previously provided or geographical locations of the client device 110 (e.g., including historical data). The location search engine 220 receives 840 a first set of candidate geographical locations from the first map data source based on the geographical search request. For instance, the candidate geographical locations are addresses that potentially match the address of the target geographical location.

The location search engine 220 uses one or more processors to determine 850 a quality level of the first set of candidate geographical locations. The location search engine 220 selects 860 a second map data source from the set in response to determining that the quality level is below a threshold value. The location search engine 220 receives 870 a second set of candidate geographical locations from the second map data source based on the geographical search request. The location search engine 220 provides 880 one or more candidate geographical locations of the second set of candidate geographical locations to the client device 110 for display, e.g., in response to determining that a quality level of the second set of candidate geographical locations is greater than the threshold value.

In one embodiment, in response to receiving a subsequent geographical search request associated the geographical region, the location search engine 220 selects the second map data source (or another map data source) from a subset of the map data sources. The subset does not include the first map data source because the location search engine 220 determined that the quality level of the first set of candidate geographical locations was poor (e.g., less than the threshold value). The location search engine 220 may save computational resources by excluding the first map data source from the subset, and thus avoiding the selection and querying of the first map data source.

VIII. Example Physical Components of a Computer

Figure 9:
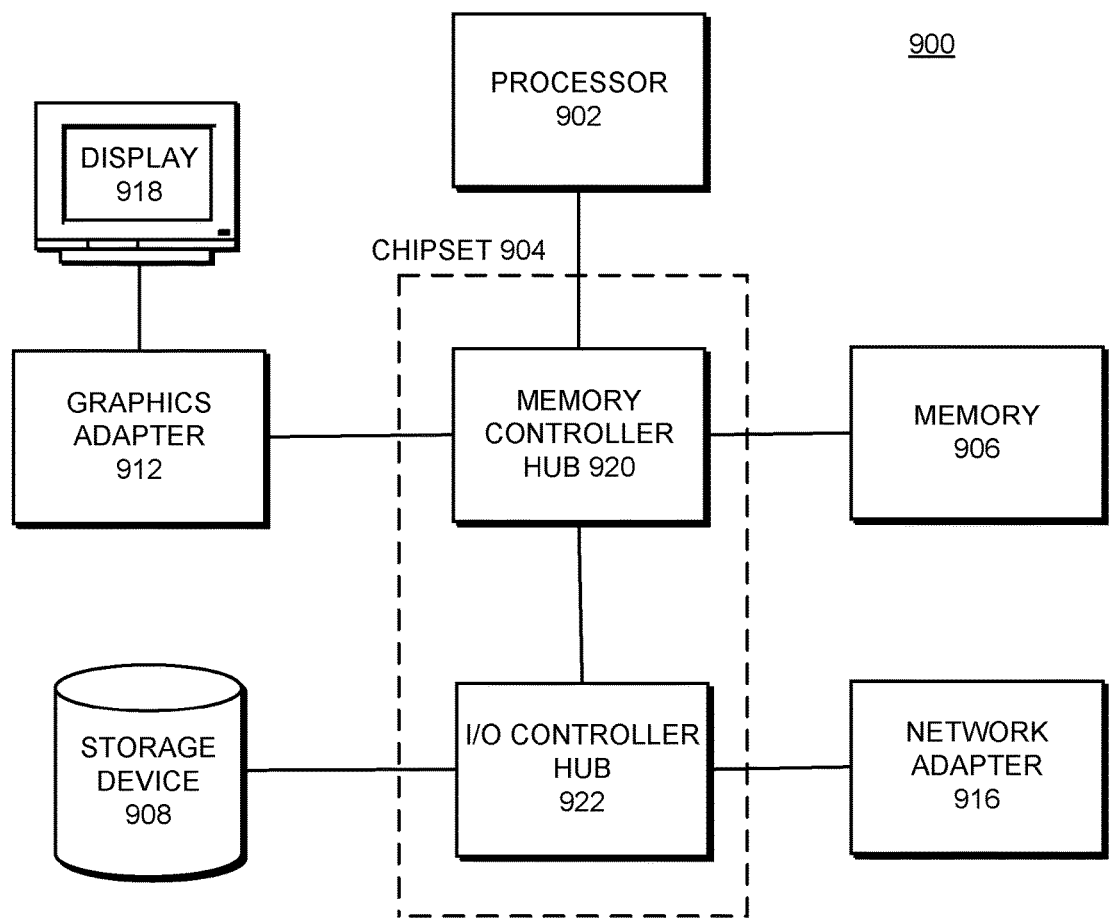
FIG. 9 is a high-level block diagram illustrating physical components of a computer used as part or all of the components from FIG. 1A, according to one embodiment.

FIG. 9 is a high-level block diagram illustrating physical components of a computer 900 used as part or all of the components from FIG. 1A (e.g., the service arrangement system 100, client device 110, and/or the data sources 140, 150, and 160), according to one embodiment. Illustrated are at least one processor 902 coupled to a chipset 904. Also coupled to the chipset 904 are a memory 906, a storage device 908, a graphics adapter 912, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is any non-transitory computer-readable storage medium, such as a hard drive, compact disk read-only memory (CD-ROM), DVD, or a solid-state memory device. The memory 906 holds instructions and data used by the processor 902. The graphics adapter 912 displays images and other information on the display 918. The network adapter 916 couples the computer 900 to a local or wide area network.

As is known in the art, a computer 900 can have different and/or other components than those shown in FIG. 9. In addition, the computer 900 can lack certain illustrated components. In one embodiment, a computer 900 such as a server or smartphone may lack a graphics adapter 912, and/or display 918, as well as a keyboard or pointing device. Moreover, the storage device 908 can be local and/or remote from the computer 900, e.g., embodied within a storage area network (SAN).

As is known in the art, the computer 900 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 908, loaded into the memory 906, and executed by the processor 902.

IX. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a geographical search request from a client device of a user of a service arrangement system corresponding to a target geographical location;
   identifying a geographical region based on the geographical search request;
   identifying a selection rule of a plurality of selection rules indicative of allocations of geographical search requests to a plurality of map data sources associated with the geographical region;
   using one or more processors, selecting a first map data source of a plurality of map data sources based on the selection rule, each of the plurality of map data sources associated with the geographical region;
   receiving a first set of candidate geographical locations for the target geographical location from the first map data source based on the geographical search request;
   using one or more processors, determining a quality level of the first set of candidate geographical locations;
   using the one or more processors, selecting a second map data source of the plurality of map data sources in response to determining that the quality level is below a first threshold value, the second map data source selected based on the selection rule;
   receiving a second set of candidate geographical locations for the target geographical location from the second map data source based on the geographical search request; and
   providing one or more candidate geographical locations of the second set of candidate geographical locations to the client device for display.

2. The method of claim 1, further comprising receiving information indicative of a likelihood that at least one candidate geographical location of the first set corresponds to the target geographical location, wherein the quality level is based on the likelihood.

3. The method of claim 1, further comprising determining another quality level of the second set of candidate geographical locations, wherein providing the second set of candidate geographical locations to the client device is in response to determining that the another quality level is greater than the first threshold value.

4. The method of claim 1, wherein the geographical search request includes a sequence of characters input by the user, the quality level is based on whether the number of characters in the sequence of characters is greater than a second threshold value.

5. The method of claim 1, further comprising:
   receiving feedback in response to providing the one or more candidate geographical locations; and
   modifying at least one of the plurality of selection rules based on the feedback.

6. The method of claim 1, wherein the plurality of selection rules indicate, for each map data source of the plurality of map data sources, a proportion of geographical search requests from client devices of users of the service arrangement system to allocate to the corresponding map data source.

7. The method of claim 1, further comprising:
   receiving a subsequent geographical search request;
   identifying the geographical region based on the subsequent geographical search request;
   selecting the second map data source from a subset of the plurality of map data sources, the subset not including the first map data source; and
   receiving a third set of candidate geographical locations for the target geographical location from the second map data source.

8. The method of claim 1, further comprising:
   receiving map data source information associated with a target map data source;
   modifying the plurality of selection rules to indicate an allocation of geographical search requests to the target map data source;
   determining that the target map data source provides map data associated with a target geographical region; and
   modifying a plurality of map data sources associated with the target geographical region to include the target map data source.

9. The method of claim 1, wherein the quality level is based on a latency of receiving the first set of candidate geographical locations from the first map data source being below a second threshold value.

10. The method of claim 1, wherein the second map data source associated with a second geographical region larger than the geographical region and including the geographical region.

11. The method of claim 10, wherein the target geographical location is located within a predetermined distance outside of the geographical region, and further comprising:
    providing at least one candidate geographical location of the first set along with the second set to the client device for display.

12. A method comprising:
    receiving a geographical search request from a client device of a user of a service arrangement system corresponding to a target geographical location;
    identifying a selection rule of a plurality of selection rules indicative of allocations of geographical search requests to a plurality of map data sources;
    receiving a first set of candidate geographical locations for the target geographical location from a first map data source of the plurality of map data sources based on the geographical search request;
    using one or more processors, determining a first quality level of the first set of candidate geographical locations;
    using the one or more processors, selecting a second map data source of the plurality of map data sources in response to determining that the first quality level is below a threshold value, the second map data source selected based on the selection rule;

receiving a second set of candidate geographical locations for the target geographical location from the second map data source based on the geographical search request;

using the one or more processors, determining a second quality level of the first set of candidate geographical locations; and providing one or more candidate geographical locations of the second set of candidate geographical locations to the client device for display in response to determining that the second quality level is greater than the threshold value.

13. The method of claim 12, wherein the quality level is based on a latency of receiving the first set of candidate geographical locations from the first map data source being below a second threshold value.

14. A computer program product comprising a non-transitory computer readable storage medium having instructions encoded thereon that, when executed by one or more processors, cause the one or more processors to:

receive a geographical search request from a client device of a user of a service arrangement system corresponding to a target geographical location;

identify a geographical region based on the geographical search request;

identify a selection rule of a plurality of selection rules indicative of allocations of geographical search requests to a plurality of map data sources associated with the geographical region select a first map data source of a plurality of map data sources based on the selection rule, each of the plurality of map data sources associated with the geographical region;

receive a first set of candidate geographical locations for the target geographical location from the first map data source based on the geographical search request;

using one or more processors, determine a quality level of the first set of candidate geographical locations;

select a second map data source of the plurality of map data sources in response to determining that the quality level is below a first threshold value, the second map data source selected based on the selection rule;

receive a second set of candidate geographical locations for the target geographical location from the second map data source based on the geographical search request; and provide one or more candidate geographical locations of the second set of candidate geographical locations to the client device for display.

15. The non-transitory computer readable storage medium of claim 14, having further instructions that when executed by the one or more processors cause the one or more processors to determine another quality level of the second set of candidate geographical locations, wherein providing the second set of candidate geographical locations to the client device is in response to determining that the another quality level is greater than the first threshold value.

16. The non-transitory computer readable storage medium of claim 14, wherein the geographical search request includes a sequence of characters input by the user, the quality level is based on whether the number of characters in the sequence of characters is greater than a second threshold value.

17. The non-transitory computer readable storage medium of claim 14, having further instructions that when executed by the one or more processors cause the one or more processors to:

receive feedback in response to providing the one or more candidate geographical locations; and modify at least one of the plurality of selection rules based on the feedback.

18. The non-transitory computer readable storage medium of claim 14, having further instructions that when executed by the one or more processors cause the one or more processors to:

receive a subsequent geographical search request;

identify the geographical region based on the subsequent geographical search request;

select the second map data source from a subset of the plurality of map data sources, the subset not including the first map data source; and receive a third set of candidate geographical locations for the target geographical location from the second map data source.

19. The non-transitory computer readable storage medium of claim 14, wherein the plurality of selection rules indicate, for each map data source of the plurality of map data sources, a proportion of geographical search requests from client devices of users of the service arrangement system to allocate to the corresponding map data source.

20. The non-transitory computer readable storage medium of claim 14, having further instructions that when executed by the one or more processors cause the one or more processors to:

receive map data source information associated with a target map data source;

modify the plurality of selection rules to indicate an allocation of geographical search requests to the target map data source;

determine that the target map data source provides map data associated with a target geographical region; and modify a plurality of map data sources associated with the target geographical region to include the target map data source.

* * * * *

UNITED STATES PATENT AND TRADEMARK OFFICE
CERTIFICATE OF CORRECTION

PATENT NO. : 10,002,140 B2  
APPLICATION NO. : 15/393171  
DATED : June 19, 2018  
INVENTOR(S) : Srihari Reddy et al.

Page 1 of 1

It is certified that error appears in the above-identified patent and that said Letters Patent is hereby corrected as shown below:

On the Title Page

Item (*) Notice: delete "by 0 days. days." and insert -- by 0 days. --

In the Claims

Claim 14, Column 23, Line 29: delete "region" and insert -- region; --

Signed and Sealed this  
Eighteenth Day of September, 2018

Andrei Iancu  
*Director of the United States Patent and Trademark Office*